United States Patent
Shibata

[11] Patent Number: 5,754,105
[45] Date of Patent: May 19, 1998

[54] AUTOHANDLER

[75] Inventor: Kenji Shibata, Tokyo, Japan

[73] Assignee: Ando Electric Co., Ltd., Tokyo, Japan

[21] Appl. No.: 717,510

[22] Filed: Sep. 20, 1996

[30] Foreign Application Priority Data

Sep. 28, 1995 [JP] Japan .................................. 7-274721

[51] Int. Cl.⁶ .................................................. G08B 21/00
[52] U.S. Cl. ........................ 340/540; 340/674; 340/679; 340/686; 414/277; 414/674; 414/787
[58] Field of Search .................................. 340/540, 674, 340/679, 686; 414/277, 674, 786, 787

[56] References Cited

U.S. PATENT DOCUMENTS 5,312,221  5/1994  Furukawa et al. ...................... 414/786

*Primary Examiner*—Glen Swann
*Attorney, Agent, or Firm*—Flynn, Thiel, Boutell & Tanis, P.C.

[57] ABSTRACT

An autohandler for supplying a lot of feed trays carrying samples and for removing a lot of return trays loaded with tested samples. A loading mechanism has a feed tray elevator containing samples to be tested. An unloading mechanism has a return tray elevator for receiving return trays containing tested samples. An empty tray storage unit stores empty trays. A tray transfer hand transfers the trays. A sensor detects the feed tray elevator position. The sensor actuates an alarm when the feed tray elevator is almost empty.

3 Claims, 6 Drawing Sheets

FIG. 5
PRIOR ART

◇ ---- VACANT
◆ ---- OCCUPIED (1) INITIAL STATE

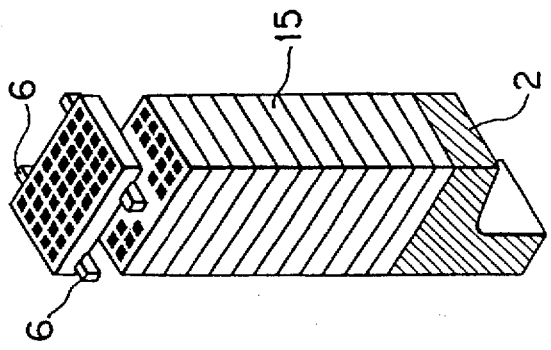

OPERATION IN PROGRESS →

(2) CRITICAL STATE WHERE ONLY ONE FEED TRAY IS LEFT
ALARM IS GENERATED
AUTOHANDLER IN OPERATION

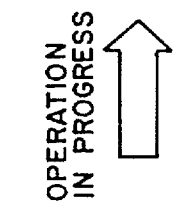

OPERATION IN PROGRESS →

(3) FEED TRAY IS EMPTY
ALARM CONTINUES
AUTOHANDLER STOPS

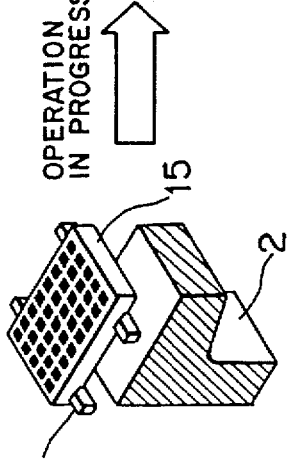

T1: TIME AVAILABLE FOR REPLENISHING THE FEED TRAY ELEVATOR WITH FEED TRAYS WITHOUT INTERRUPTING THE OPERATION OF THE AUTOHANDLER

T2: TIME REQUIRED BY WORK FOR FEED TRAY REPLENISHMENT

T3: DOWNTIME

FIG. 6
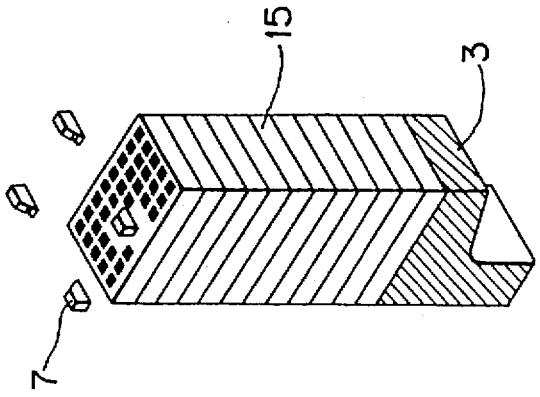
(2) RETURN TRAY ELEVATOR IS LOADED TO ITS MAXIMUM LOAD CAPACITY
ALARM CONTINUES
AUTOHANDLER STOPS
T5: TIME REQUIRED BY WORK FOR UNLOADING THE RETURN TRAY ELEVATOR
T6: DOWNTIME
OPERATION IN PROGRESS
◇ ---- VACANT
◆ ---- OCCUPIED
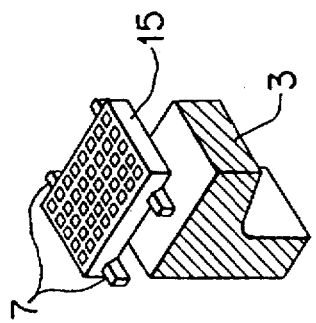
(1) INITIAL STATE

AUTOHANDLER

BACKGROUND OF THE INVENTION

1. Field of the Invention

The present invention relates to an autohandler having a loading mechanism and an unloading mechanism, and more specifically, to a horizontal transfer autohandler having a loading mechanism provided with an automatic elevating device for automatically feeding feed trays containing samples to be processed and an automatic elevating device for automatically receiving return trains containing processed samples.

2. Description of the Related Art

Referring to FIG. 4 showing a conventional autohandler 1 having a loading mechanism and an unloading mechanism, there are shown a feed tray elevator 2, a return tray elevator 3, an empty tray buffer 4, a tray transfer hand 5, separating fingers 6 and 7, a defective sample storage 8, and elevator operating switches 9 and 10.

In a sample testing process, the feed tray elevator 2 of the autohandler 1 elevates a stack of trays 15 containing untested samples to a predetermined level. The separating fingers 6 separate the top tray 15, i.e., the first tray, from the stack of trays 15, and then a feed hand, not shown, starts a sample feed operation to feed the samples. After all the samples contained in the first tray has been fed and the first tray 15 has become empty, the tray transfer hand 5 transfers the empty tray 15 to the empty tray buffer 4 for temporary storage. Then, the feed elevator 2 elevates the stack of trays 15 again, the separating fingers 6 separate the next tray 15 from the stack of trays 15, and the feed hand starts the sample feed operation again to feed the samples from the next tray 15. The empty trays 15 temporarily stored in the empty tray buffer 4 are transferred onto the separating fingers 7 disposed above the return tray elevator 3, and then a return hand, not shown delivers the tested samples to the tray 15 or the defective sample storage 8.

At the start of the sample testing process, a stack of a plurality of trays 15 is mounted on the feed elevator 2 as shown in FIG. 5(1) and the number of the trays 15 decreases with the progress of the sample testing process. When only one tray 15 is left on the feed tray elevator 2 as shown in FIG. 5 (2), an alarm is given to notify the operator that only the last tray 15 is left on the feed tray elevator 2, and the feed tray elevator is lowered to mount another stack of trays 15 on the feed tray elevator 2. The autohandler 1 continues its operation until all the samples contained in the last tray 15 is fed. Upon the completion of feeding all the samples from the last tray 15 as shown in FIG. 5 (3), another alarm is given and the autohandler 1 stops.

When a tray 15 transferred onto the separating fingers 7 by the tray transfer hand 5 is fully loaded with tested samples, the tray 15 is transferred from the separating fingers 7 to the return tray elevator 3, and then an empty tray 15 is transferred onto the separating finger 7 by the tray transfer hand 5 as shown in FIGS. 6(1) and 6(2). Then, the return hand starts delivering tested samples to the empty tray 15. As these operations are repeated, and a predetermined number of trays fully loaded with tested samples have been stacked on the return elevator 3, i.e., the return elevator 3 is loaded to its full capacity. Then, the autohandler 1 gives an alarm and stops, requesting the removal of the trays fully loaded with the tested samples.

The autohandler 1 is provided with the elevator operating switch 9 to be operated by the operator to give a signal requesting an operation for lowering the feed tray elevator 2 and the elevator operating switch 10 to be operated by the operator to give a signal requesting an operation for raising the return tray elevator 3. Therefore, trays 15 carrying samples can be supplied onto the feed tray elevator 2 and trays fully loaded with tested samples can be removed from the return tray elevator 3 without stopping the feed and return operations of the autohandler 1.

In most cases, additional feed trays carrying samples are supplied onto the feed tray elevator 2 or trays fully loaded with tested samples are removed from the return tray elevator 3 after the alarm has been given and it has been confirmed that the last feed tray has become empty or that the last return tray has been fully loaded with tested samples. Therefore, in most cases, work for supplying additional feed trays and work for removing return trays fully loaded with tested samples are carried out after the autohandler 1 has stopped. For instance, the loading mechanism of the autohandler does not give any alarm until the state shown in FIG. 5(2) occurs. Therefore, when the last tray contains only a few samples, a time T1 (FIG. 5) available for supplying additional feed trays containing samples without stopping the autoloader 1 is very short. If a time T2 (FIG. 5) necessary for supplying additional feed trays is longer than the time T1, the autohandler 1 stops for a downtime T3 (FIG. 5). The autohandler 1 stops simultaneously with the generation of an alarm by the unloading mechanism of the autohandler 1 in a state shown in FIG. 6(2), a time T5 (FIG. 6) necessary for removing return trays fully loaded with tested samples is a downtime during which the autohandler 1 does not operate.

Generally, several autohandlers are allocated to one operator. It is possible that all the autohandlers allotted to one operator give alarms simultaneously and, while the operator is engaged in operation for one of those autohandlers, the rest of the autohandlers stay inoperative. If such a condition occurs, the downtime of the autohandlers is far longer than the times T3 and T5 and, consequently, the efficiency of the sorting process is reduced.

SUMMARY OF THE INVENTION

Accordingly, it is an object of the present invention to provide an autohandler, capable of supplying the next lot of feed trays carrying samples before the exhaustion of the preceding lot of feed trays in process and of removing a lot of return trays fully loaded with tested samples before the autohandler stops to reduce the downtime of the autohandler significantly.

According to a first aspect of the present invention, an autohandler comprises a loading mechanism provided with a feed tray elevator for feeding feed trays containing samples to be tested, an unloading mechanism provided with a return tray elevator for receiving return trays containing tested samples, an empty tray storage unit for temporarily storing empty trays, a tray transfer hand for transferring an empty tray from the feed tray elevator to the empty tray storage unit and transferring an empty tray from the empty tray storage unit to the return tray elevator, and a sensor capable of detecting the feed tray elevator when the feed tray elevator passes a predetermined position during up travel. An alarm is generated before all the samples contained in the feed trays are fed.

According to a second aspect of the present invention, an autohandler comprises a loading mechanism provided with a feed tray elevator for feeding feed trays containing samples to be tested, an unloading mechanism provided with a return tray elevator, an empty tray storage unit for temporarily storing empty trays, a tray transfer hand for transferring an empty tray from the feed tray elevator to the empty tray storage unit and transferring an empty tray from the empty tray storage unit to the return tray elevator, and a sensor capable of detecting the return tray elevator when the return tray elevator passes a predetermined position during down travel. An alarm is generated before the return tray elevator is loaded with trays containing processed samples to its maximum load capacity.

According to a third aspect of the present invention, an autohandler comprises a loading mechanism provided with a feed tray elevator for feeding feed trays containing samples to be tested, an unloading mechanism provided with a return tray elevator for receiving return tray containing tested samples, an empty tray storage unit for temporarily storing empty trays, a tray transfer hand for transferring an empty tray from the feed tray elevator to the empty tray storage unit and transferring an empty tray from the empty tray storage unit to the return tray elevator, a sensor capable of detecting the feed tray elevator when the feed tray elevator passes a predetermined position during up travel, and a sensor capable of detecting the return tray elevator when the return tray elevator passes a predetermined position during down travel. An alarm is generated before all the samples contained in the feed trays are fed, and an alarm is generated before the return tray elevator is loaded with return trays containing tested samples to its maximum load capacity.

The feed tray elevator of the loading mechanism moves up gradually with the progress of the operation of the autohandler. The sensor detects the feed tray elevator and an alarm is given without stopping the autohandler when only a few feed trays are left on the feed tray elevator to notify the operator that the feed tray elevator needs to be replenished with feed trays.

The return tray elevator of the unloading mechanism moves down gradually with the progress of the operation of the autohandler. The sensor detects the return tray elevator and an alarm is given without stopping the autohandler when the return tray elevator is loaded with the return trays nearly to its maximum load capacity to notify the operator that the return tray elevator needs to be unloaded.

BRIEF DESCRIPTION OF THE DRAWINGS

The above and other objects, features and advantages of the present invention will become more apparent from the following description taken in connection with the accompanying drawings, in which:

FIG. 5 is a perspective view of assistance in explaining the operation of a feed tray elevator included in the autohandler of FIG. 4, it being understood that FIG. 5 includes subsections (1) to (3) which are hereinafter referred to as FIGS. 5(1) to 5(3) for convenience in reference; and FIG. 6 is a perspective view of assistance in explaining the operation of a return tray elevator included in the autohandler of FIG. 4, it being understood that FIG. 6 includes subsections (1) and (2) which are hereinafter referred to as FIGS. 6(1) and 6(2) for convenience in reference.

DETAILED DESCRIPTION OF THE PREFERRED EMBODIMENTS

Figure 1:
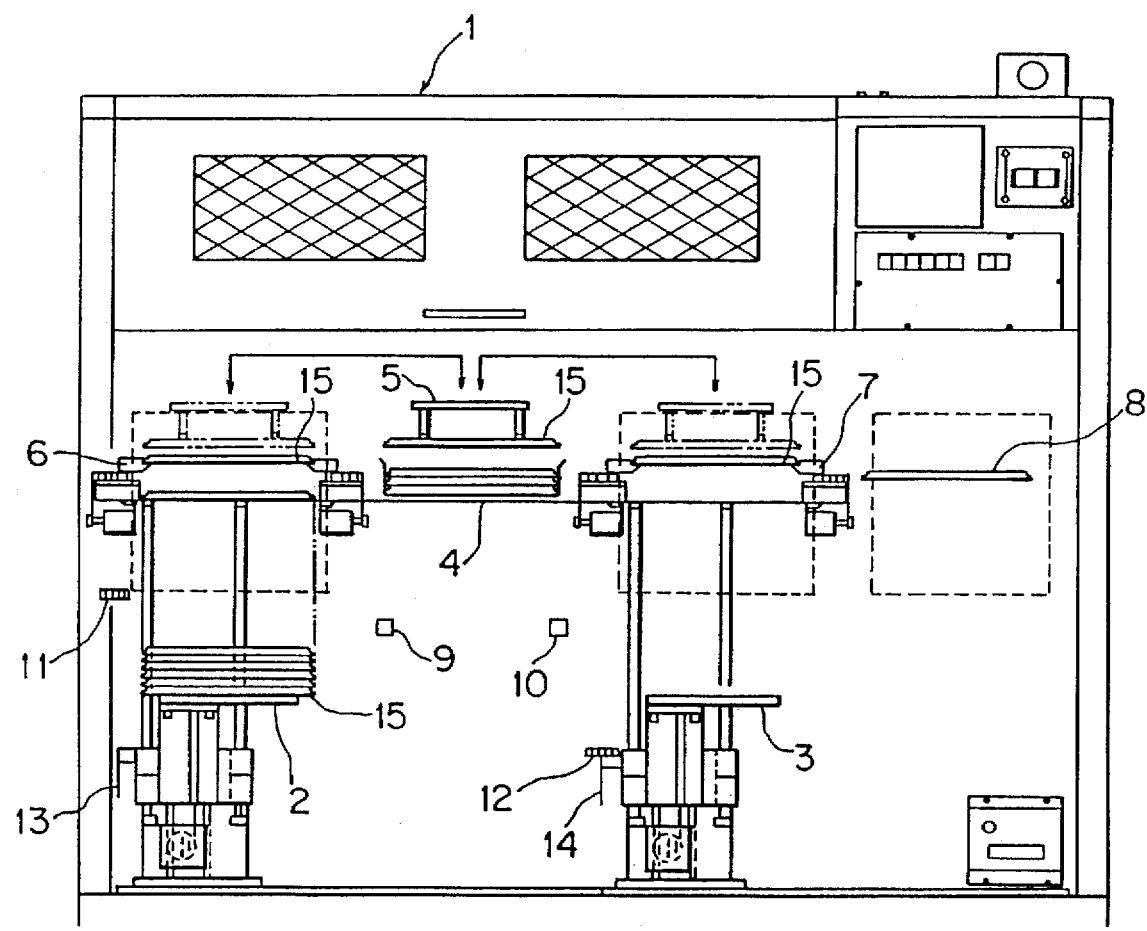
FIG. 1 is a front view of an autohandler in a preferred embodiment according to the present invention.
Figure 4:
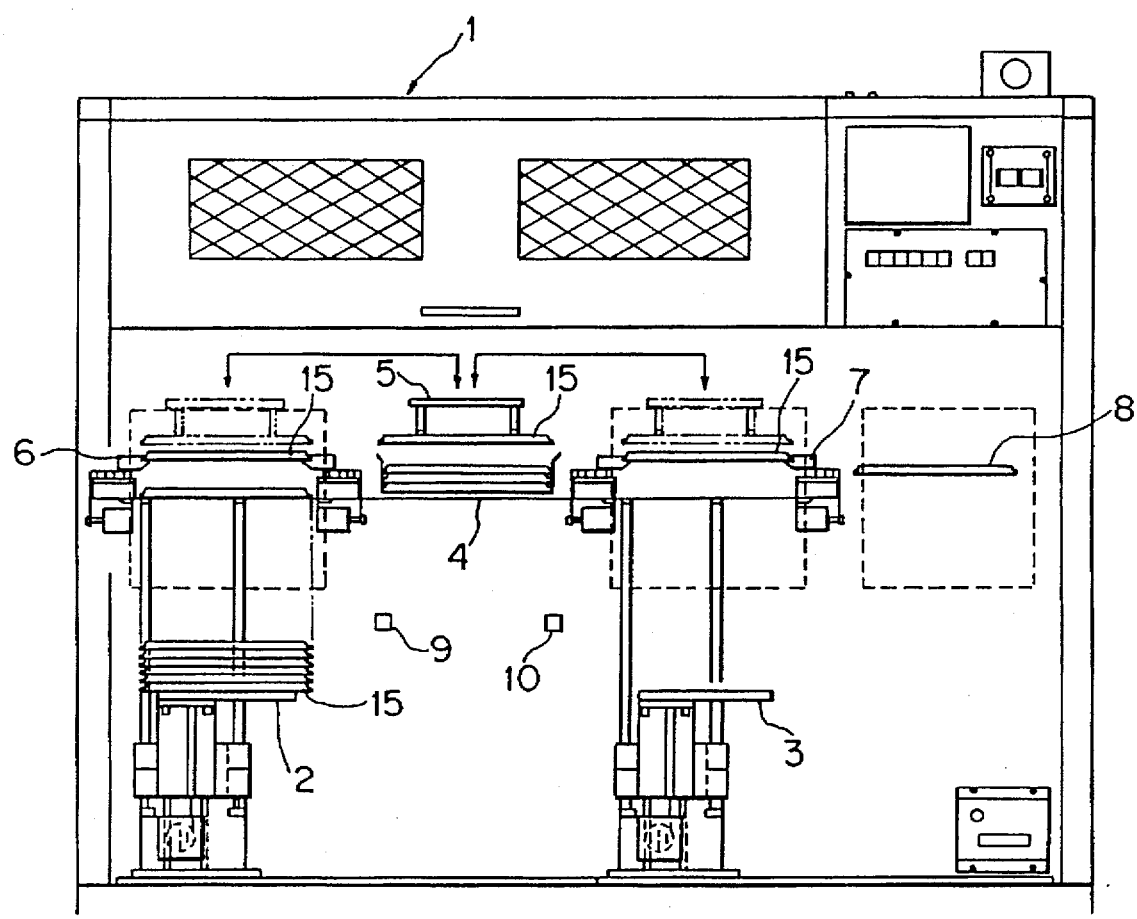
FIG. 4 is a front view of a conventional autohandler.

Referring to FIG. 1, there are shown an autohandler 1 in a preferred embodiment according to the present invention, a feed tray elevator 2 driven for vertical movement by an ac servomotor, a return tray elevator 3, an empty tray storage unit 4, a tray transfer hand 5, separating fingers 6 and 7, a defective sample storage unit 8, elevator operating switches 9 and 10, a sensor 11 for detecting the upward movement of the feed tray elevator 2 past a predetermined position, a sensor 12 for detecting the downward movement of the return tray elevator 3 past a predetermined position, and sensor actuating plates 13 and 14 for actuating the sensors 11 and 12, respectively. The autohandler in this embodiment is provided with the sensors 11 and 12, and the sensor actuating plates 13 and 14 in addition to the components of the conventional autohandler shown in FIG. 4.

Figure 2:
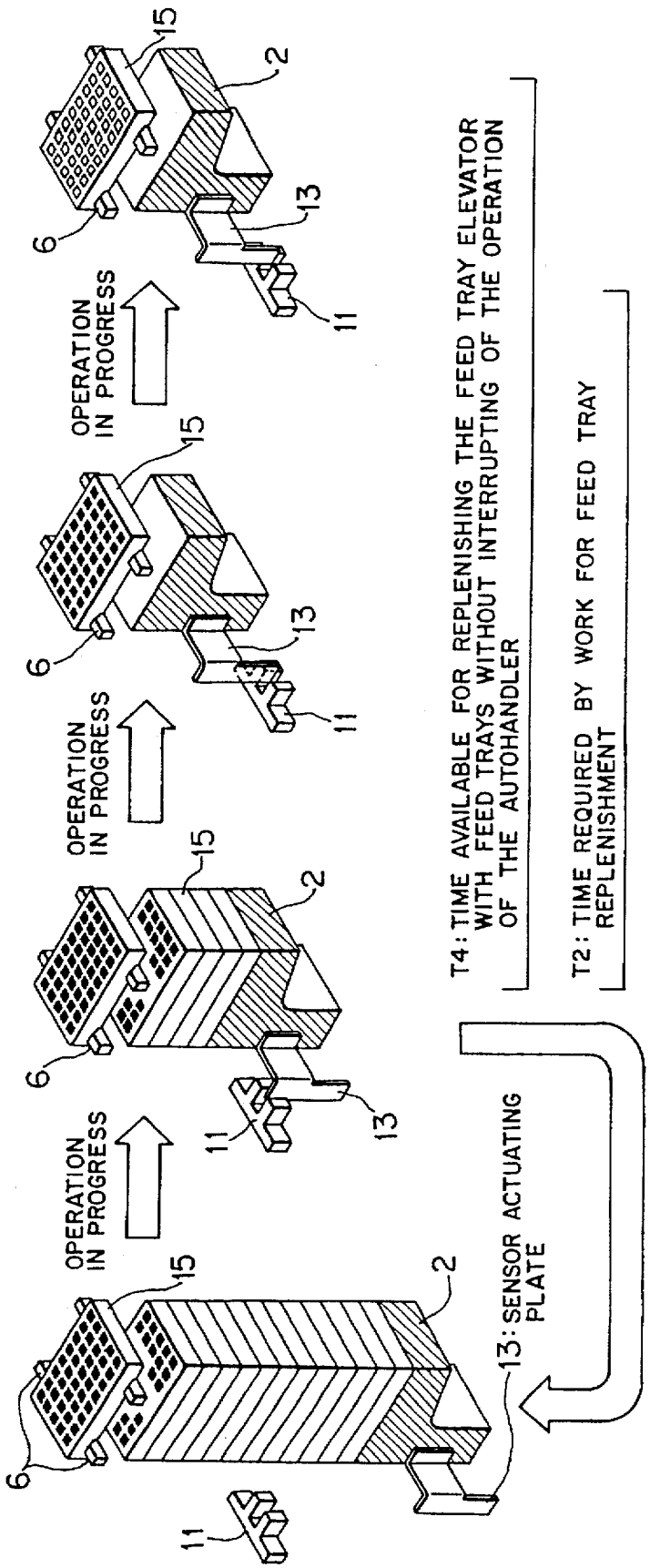
FIG. 2 is a perspective view of assistance in explaining the operation of a feed tray elevator included in the autohandler of FIG. 1, it being understood that FIG. 2 includes subsections (1) to (4) which are hereinafter referred to as FIGS. 2(1) to 2(4) for convenience in reference.

FIGS. 2(1) to 2(4) show the feed tray elevator 2 in different phases of operation. At the start of the operation of the autohandler 1, a plurality of feed trays 15 containing samples are stacked on the feed tray elevator 2, and the top feed tray 15 is held by the separating fingers 6 as shown in FIG. 2(1). The samples are transferred sequentially for measurement from the feed tray 15 held by the separating fingers 6 to a measuring station, not shown, by a sample feed hand, not shown. After all the samples contained in the feed tray 15 held by the separating fingers 6 have been fed to the measuring station and the feed tray 15 held by the separating fingers 6 has become empty, the tray transfer hand 5 transfers the empty tray 15 to the empty tray storage unit 4 for temporary storage. Then, the feed tray elevator 2 elevates the stack of feed trays 15, the separating fingers 6 hold the next top feed tray 15, and the samples are fed from the next top feed tray 15 held by the separating fingers 6 to the measuring station by the sample feed hand as shown in FIG. 2(2). These operations are repeated to feed the samples from the feed trays 15 stacked on the feed tray elevator 2. When the feed tray elevator 2 thus rises gradually and arrives at the predetermined position, i.e., when only a predetermined small number of feed trays are left on the feed tray elevator 2, the sensor actuating plate 13 actuates the sensor 11 and, consequently, the sensor 11 generates an alarm. Preferably, a message, "The feed tray elevator is almost empty. Replenish the feed tray elevator with feed trays." is displayed simultaneously with the generation of the alarm. At this stage, the autohandler 1 is able to continue its operation to feed the remaining samples and does not stop.

The operator operates the elevator operating switch 9 to move the feed tray elevator 2 down and supplies feed trays 15 containing samples onto the feed tray elevator 2 in a time T4 from a point of time when the alarm is given through a point of time when the feed tray elevator 2 is at the uppermost position and the samples are fed from the last feed tray 15 as shown in FIG. 2(3) to a point of time when the last feed tray 15 becomes empty as shown in FIG. 2(4). Thus, the feed tray elevator 2 is always loaded with feed trays 15 as shown in FIGS. 2(1) and 2(2) and is never exhausted of feed trays 15. Therefore, the autohandler 1 is able to operate continuously. When all the feed trays 15 containing samples to be subjected to measurement have been fed, the number of the feed trays 15 stacked on the feed tray elevator 2 decreases gradually as shown in FIGS. 2(2) and 2(3) and upon the exhaustion of the last feed tray 15 of the samples as shown in 2(4), the autohandler 1 stops.

Figure 3:
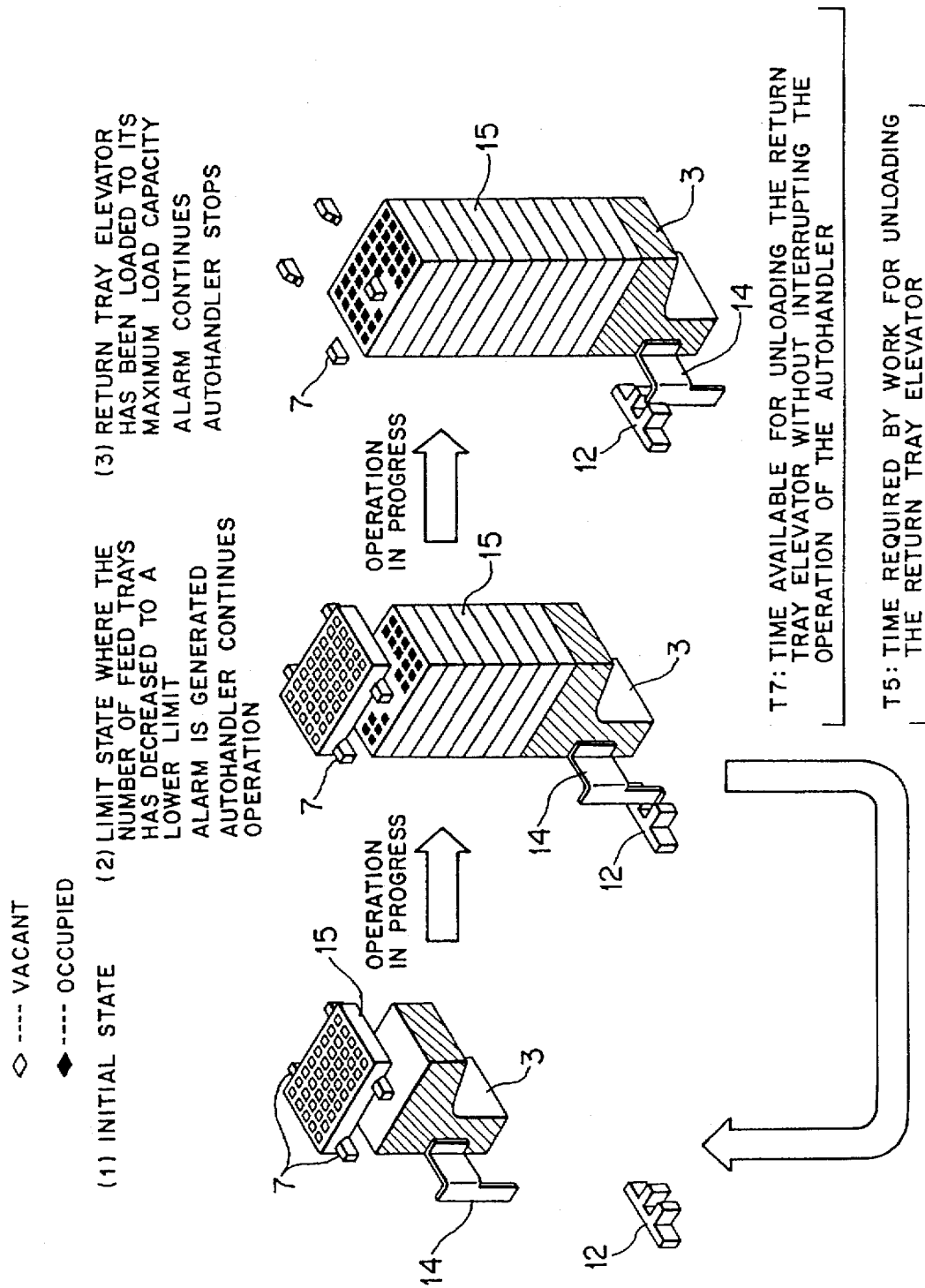
FIG. 3 is a perspective view of assistance in explaining the operation of a return tray elevator included in the autohandler of FIG. 1, it being understood that FIG. 3 includes subsections (1) to (3) which are hereinafter referred to as FIGS. 3(1) to 3(3) for convenience in reference.

FIGS. 3(1) to 3(3) show the return tray elevator 3 in different phases of operation during a tested sample returning operation. At the start of the operation of the autohandler 1, no return tray is supported on the return tray elevator 3 and an empty return tray 15 is held by the separating fingers 7. Tested samples are transferred sequentially onto the return tray 15 held by the separating fingers 7 by a return hand, not shown. When the return tray 15 is fully loaded with the tested samples, the separating fingers 7 put the fully loaded return tray 15 on the return tray elevator 3, and the tray transfer hand 5 sets an empty return tray 15 on the separating fingers 7, and then the tested sample returning operation is repeated. When the return tray elevator is loaded nearly to its maximum load capacity, the sensor actuating plate 14 actuates the sensor 12 and an alarm is generated. Preferably, a message, "The return tray elevator is almost full. Unload the return tray elevator." is displayed simultaneously with the generation of the alarm. At this stage, the autohandler 1 is able to continue its operation to return the tested samples to the return tray 15.

The operator unloads the return trays 15 accumulated on the return tray elevator 3 in a time T7 from a point of time when the alarm is generated to a point of time when the return tray elevator 3 is loaded to its maximum load capacity and the autohandler 1 stops. Thus, the return tray elevator 3 is always loaded with return trays 15 as shown in FIGS. 3(1) and 3(2) and is never excessively loaded with return trays 15. Therefore, the autohandler 1 is able to operate continuously. The return tray elevator 3 is in a state shown in FIG. 3(3) when all the samples to be subjected to measurement have been measured.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An autohandler comprising:

a loading mechanism provided with a feed tray elevator for feeding feed trays containing samples to be tested;

an unloading mechanism provided with a return tray elevator for receiving return trays containing tested samples;

an empty tray storage unit for temporarily storing empty trays;

a tray transfer hand for transferring an empty tray from the feed tray elevator to the empty tray storage unit and transferring an empty tray from the empty tray storage unit to the return tray elevator; and a sensor capable of detecting the feed tray elevator when the feed tray elevator passes a predetermined position during up travel;

wherein an alarm is generated upon the detection of the upward movement of the feed tray elevator past the predetermined position by the sensor to warn the operator that the feed tray elevator is almost empty.

2. An autohandler comprising:

a loading mechanism provided with a feed tray elevator for feeding feed trays containing samples to be tested;

an unloading mechanism provided with a return tray elevator for receiving return trays containing tested samples;

an empty tray storage unit for temporarily storing empty trays;

a tray transfer hand for transferring an empty tray from the feed tray elevator to the empty tray storage unit and transferring an empty tray from the empty tray storage unit to the return tray elevator; and a sensor capable of detecting the return tray elevator when the return tray elevator passes a predetermined position during down travel;

wherein an alarm is generated upon the detection of the downward movement of the return tray elevator past the predetermined position to warn the operator that the return tray elevator is loaded with return trays containing tested samples nearly to its maximum load capacity.

3. An autohandler comprising;

An autohandler comprising:

a loading mechanism provided with a feed tray elevator for feeding feed trays containing samples to be tested;

an unloading mechanism provided with a return tray elevator for receiving return trays containing tested samples;

an empty tray storage unit for temporarily storing empty trays;

a tray transfer hand for transferring an empty tray from the feed tray elevator to the empty tray storage unit and transferring an empty tray from the empty tray storage unit to the return tray elevator;

a sensor capable of detecting the feed tray elevator when the feed tray elevator passes a predetermined position during up travel; and a sensor capable of detecting the return tray elevator when the return tray elevator passes a predetermined position during down travel;

wherein an alarm is generated upon the detection of the upward movement of the feed tray elevator past the predetermined position by the sensor to warn the operator that the feed tray elevator is almost empty and an alarm is generated upon the detection of the downward movement of the return tray elevator past the predetermined position to warn the operator that the return tray elevator is loaded with return trays containing tested samples nearly to its maximum load capacity.

\* \* \* \* \*